US009261667B2

(12) United States Patent
Tsukagoshi (10) Patent No.: US 9,261,667 B2
(45) Date of Patent: Feb. 16, 2016

(54) DRIVING DEVICE, PROJECTOR, AND DRIVING METHOD

(71) Applicant: SEIKO EPSON CORPORATION, Tokyo (JP)

(72) Inventor: Shinichi Tsukagoshi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 165 days.

(21) Appl. No.: 14/032,789

(22) Filed: Sep. 20, 2013

(65) Prior Publication Data

US 2014/0085617 A1 Mar. 27, 2014

(30) Foreign Application Priority Data

Sep. 26, 2012 (JP) ................................. 2012-211899

(51) Int. Cl.
*G02B 7/09* (2006.01)
*G02B 7/08* (2006.01)
*G03B 3/10* (2006.01)
*G03B 21/14* (2006.01)
*G03B 21/53* (2006.01)

(52) U.S. Cl.
CPC .. *G02B 7/09* (2013.01); *G02B 7/08* (2013.01); *G03B 3/10* (2013.01); *G03B 21/142* (2013.01); *G03B 21/53* (2013.01)

(58) Field of Classification Search
CPC ............ G02B 7/102; G02B 7/10; G02B 7/08; G02B 7/023; G02B 7/04; G02B 7/282; G02B 7/646; G02B 7/021; G02B 7/105; G02B 7/09; G02B 15/14; G02B 15/177; G02B 15/22; H04N 5/2254; H04N 5/23296; H04N 5/23212; H04N 5/2252; H04N 5/2253; G03B 17/14; G03B 17/04; G03B 17/12; G03B 2205/0046; G03B 21/142; G03B 21/53; G03B 3/10
USPC ........... 353/100, 101; 359/694–706, 811–830
See application file for complete search history.

(56) References Cited

U.S. PATENT DOCUMENTS

| 6,618,559 B1 * | 9/2003 | Hofer ............................... 396/87 |
| 2011/0292525 A1 | 12/2011 | Ando et al. |
| 2012/0147340 A1 * | 6/2012 | Tsukagoshi ................... 353/101 |

FOREIGN PATENT DOCUMENTS

| JP | 05060968 A * | 3/1993 |
| JP | A-05-060968 | 3/1993 |
| JP | A-10-160999 | 6/1998 |
| JP | A-2001-013426 | 1/2001 |
| JP | A-2007-187712 | 7/2007 |
| JP | A-2009-223111 | 10/2009 |
| JP | A-2011-076029 | 4/2011 |
| JP | A-2011-248181 | 12/2011 |

* cited by examiner

*Primary Examiner* — Christina Riddle
*Assistant Examiner* — Christopher Lamb, II
(74) *Attorney, Agent, or Firm* — Oliff PLC (57) ABSTRACT

A driving device includes: a driving state detection unit which detects a driving state of a driving unit which drives a driving target; and a control unit which performs a first control for driving the driving unit for an amount based on the driving state of the driving unit detected by the driving state detection unit and a second control for driving the driving unit for a predetermined amount.

11 Claims, 6 Drawing Sheets

DRIVING DEVICE, PROJECTOR, AND DRIVING METHOD

The entire disclosure of Japanese Patent Application No. 2012-211899, filed Sep. 26, 2012 is expressly incorporated by reference herein.

BACKGROUND

1. Technical Field

The present invention relates to a driving device, a projector, and a driving method.

2. Related Art

In a projector or the like, a location of a lens is controlled by a driving device.

A driving system of a lens structurally has backlash, and when driving the lens in a reverse direction with respect to a last moving direction, it is difficult to move the lens to a proper location due to influence of the backlash.

In an example of a general configuration, a location sensor is provided near a motor, the location is detected by the location sensor in advance, a driving target (herein, lens) exists on a rear stage thereof, and accordingly, if the motor starts moving, the location sensor reacts in advance, and then, the driving target starts moving. Thus, the backlash can be compensated based on the detection results of the location by the location sensor.

In detail, as an example, by moving the driving system for an amount of the backlash, using information of the backlash amount acquired by previous measurement or the like, by monitoring output (detection results of the location) from the location sensor, the backlash can be compensated (for example, see Japanese Patent No. 3208802). As another example, by filling the backlash part by setting the motor to have low torque, the backlash can be compensated (for example, see JP-A-10-160999). In addition, as an example of a method of measuring the backlash amount, the location is detected while driving the motor at low torque, the backlash amount can be measured based at a time point when a moving rate is changed (for example, see JP-A-2007-187712).

However, when aiming to achieve miniaturization of the device, the location sensor is not always provided near the motor as the configuration described above.

For example, a driving target (herein, lens) is immediately moved by a motor and many gears exist from the motor to the location sensor, and a case of using a configuration that backlash becomes large from the motor to the location sensor is considered. In this case, since a driving target starts moving before the location sensor detects the location, it is difficult for the location sensor to detect the movement of driving target, and a movement amount acquired from the location sensor becomes smaller than the actual movement amount.

Accordingly, for example, a method of moving extra backlash part (for example, see Japanese Patent No. 3208802) is difficult to be used since the movement detected by the location sensor is smaller than the movement of the driving target. In addition, a method of filling the backlash part (for example, see JP-A-10-160999) is difficult to be used since the driving target is moved before the backlash related to the location sensor is filled. A method of measuring the backlash amount at low torque driving (for example, see JP-A-2007-187712) is difficult to be used since the change of the moving rate does not occur due to the movement of the driving target before the movement of the location sensor.

As described above, on the other hand, with respect to the configuration of the related art of providing the location sensor nearer to the motor than the driving target, in a configuration of providing the driving target nearer to the motor than the location sensor, a location relationship between the driving target and the location sensor is reversed, and the methods related to the backlash which were effective in the configuration of the related art (for example, see Japanese Patent No. 3208802, JP-A-10-160999, and JP-A-2007-187712) are difficult to be used.

As described above, in the related art, in the driving device of the configuration of providing the driving target nearer to the motor than the location sensor, there was a problem that control related to the backlash was not sufficient.

SUMMARY

An advantage of some aspects of the invention is to provide a driving device which can perform efficient control related to backlash and can be applied to others than the backlash, a projector, and a driving method.

An aspect of the invention is directed to a driving device including: a driving state detection unit which detects a driving state of a driving unit which drives a driving target; and a control unit which performs a first control for driving the driving unit for an amount based on the driving state of the driving unit detected by the driving state detection unit and a second control for driving the driving unit for a predetermined amount.

According to the configuration, the control unit performs the first control for driving the driving unit for the amount based on the driving state of the driving unit detected by the driving state detection unit and the second control for driving the driving unit for the predetermined amount. Thus, by applying the two controls (the first control and the second control) to backlash, for example, the driving device can efficiently perform control related to the backlash.

Such a driving device can be applied to others than the backlash.

Another aspect of the invention is directed to the driving device, wherein the control unit performs the first control in a case of driving the driving unit for the amount beyond a predetermined range, and performs the second control in a case of driving the driving unit for the amount in the predetermined range.

According to the configuration, the control unit performs the first control in a case of driving the driving unit for the amount beyond the predetermined range, and performs the second control in a case of driving the driving unit for the amount in the predetermined range. Thus, by applying the two controls (the first control and the second control) to the backlash using the range of the backlash as the predetermined range, for example, the driving device can efficiently perform control related to the backlash.

Still another aspect of the invention is directed to the driving device, wherein the driving target is a lens, the driving state detection unit is a location sensor which detects a location of a target moved by the driving of the driving unit as a driving state of the driving unit, the predetermined range is a range of backlash of the driving state detection unit, the predetermined amount of the second control is an amount less than the backlash amount of the driving state detection unit, and in the second control, the control unit manages the driving state of the driving unit in the range of the backlash of the driving state detection unit, without referring to detection results by the driving state detection unit.

According to the configuration, the control unit performs the first control for driving the driving unit for the amount based on the driving state (location) of the driving unit detected by the driving state detection unit (location sensor)

and the second control for driving the driving unit for the predetermined amount (amount less than the backlash amount of the driving state detection unit) performs the first control in a case of driving the driving unit for the amount beyond the predetermined range (range of the backlash of the driving state detection unit) and performs the second control in a case of driving the driving unit for the amount in the predetermined range (range of the backlash of the driving state detection unit). Accordingly, the driving device can efficiently perform control related to the backlash of the driving state detection unit (location sensor).

Yet another aspect of the invention is directed to the driving device, wherein the backlash of the driving state detection unit driven by the driving unit is larger than backlash of the driving target driven by the driving unit.

According to the configuration, in a state where the backlash of the driving state detection unit driven by the driving unit is larger than the backlash of the driving target driven by the driving unit, the control unit performs the first control for driving the driving unit for the amount based on the driving state of the driving unit detected by the driving state detection unit and the second control for driving the driving unit for the predetermined amount. Thus, by applying the two controls (the first control and the second control) to the backlash, for example, the driving device can efficiently perform control related to the backlash.

Still yet another aspect of the invention is directed to the driving device, wherein a value which is obtained by calibration performed based on detection results obtained by the driving state detection unit which are measured by repeatedly executing the driving of the driving unit by the second control plural times is set and used.

According to the configuration, detection results by the driving state detection unit are measured by repeatedly executing the driving of the driving unit by the second control plural times, calibration is performed based on the measured detection results by the driving state detection unit, and a value obtained by the performed calibration is set and used. Thus, by obtaining, setting, and using the value of the backlash amount by calibration, for example, the driving device can efficiently perform control related to the backlash.

Further another aspect of the invention is directed to a projector including: the driving device described above; and an image projection unit which projects an image, in which the driving target of the driving device is a lens of the image projection unit.

According to the configuration, the control unit of the driving device performs the first control for driving the driving unit for the amount based on the driving state of the driving unit detected by the driving state detection unit and the second control for driving the driving unit for the predetermined amount. Thus, in the driving device, by applying the two controls (the first control and the second control) to the backlash, for example, the projector can efficiently perform control related to the backlash.

Such a projector including the driving device can also be applied to others than the backlash.

Still further another aspect of the invention is directed to a driving method including: causing a driving state detection unit to detect a driving state of a driving unit which drives a driving target; causing a control unit to perform a first control for driving the driving unit for an amount based on the driving state of the driving unit detected by the driving state detection unit; and causing the control unit to perform a second control for driving the driving unit for a predetermined amount.

According to the method, the control unit performs the first control for driving the driving unit for the amount based on the driving state of the driving unit detected by the driving state detection unit and the second control for driving the driving unit for the predetermined amount. Thus, by applying the two controls (the first control and the second control) to the backlash, for example, the driving device can efficiently perform control related to the backlash.

Such a driving method can also be applied to others than the backlash.

Yet further another aspect of the invention is directed to a driving device including a control unit which performs control for continuously driving a driving unit and control for driving the driving unit for each step.

In the driving device, the control unit performs control for continuously driving a driving unit and control for driving the driving unit for each step. Thus, by applying the two controls to the backlash, for example, the driving device can efficiently perform control related to the backlash.

Such a driving device can also be applied to others than the backlash.

As described above, according to the aspects of the invention, the driving device, the projector, and the driving method can efficiently perform control related to the backlash, respectively, and can be applied to others than the backlash.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail with reference to the drawings.

Outline of Projector According to the Embodiment

Figure 1:
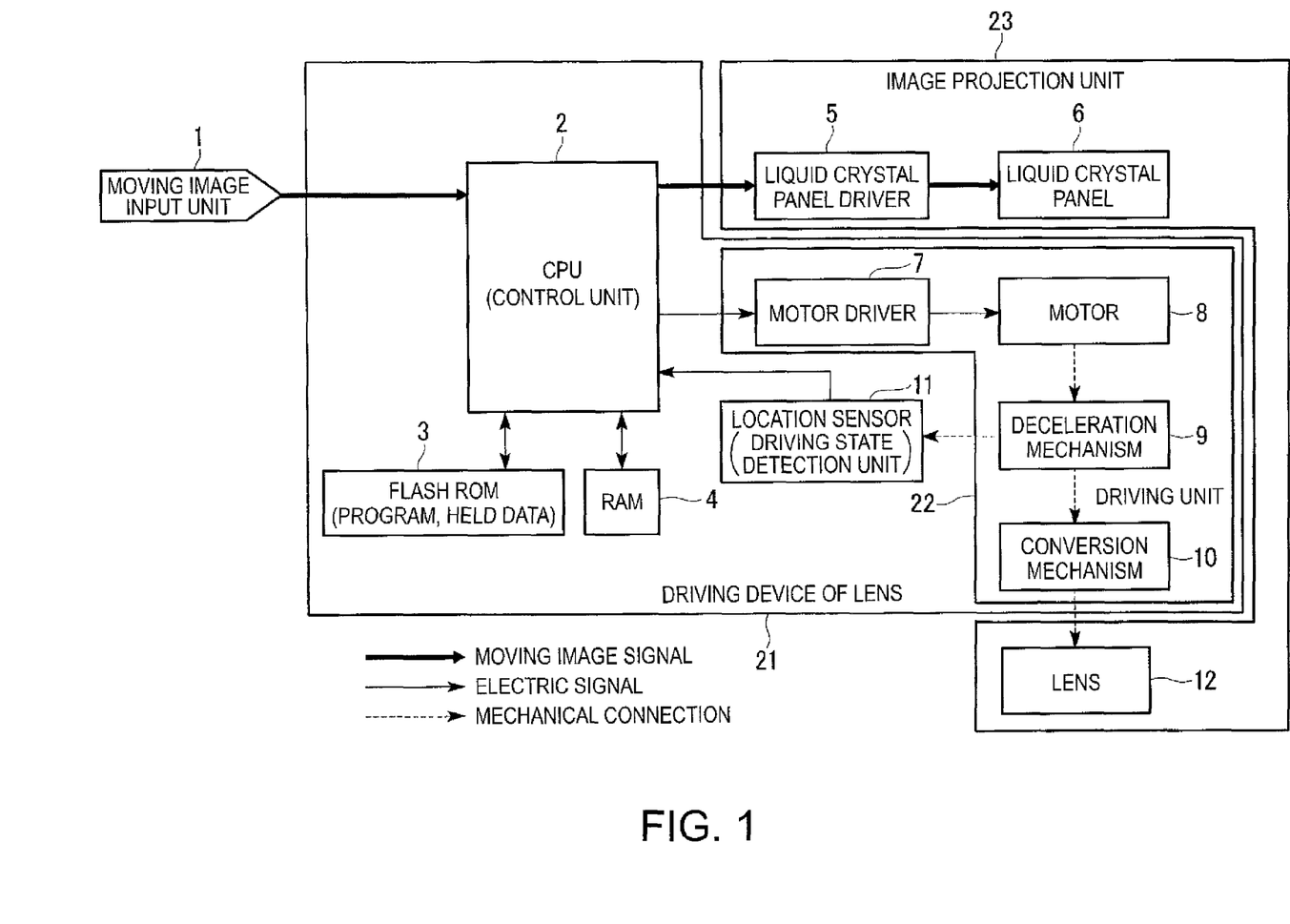
FIG. 1 is a block diagram showing a schematic configuration example of a projector according to an embodiment of the invention.

FIG. 1 is a block diagram showing a schematic configuration example of a projector according to an embodiment of the invention.

The projector according to the embodiment includes a moving image input unit 1, a Central Processing Unit (CPU) 2, a flash Read Only Memory (ROM) 3, a Random Access Memory (RAM) 4, a liquid crystal panel driver 5, a liquid crystal panel 6, a motor driver 7, a motor 8, a deceleration mechanism 9, a conversion mechanism 10, a location sensor 11, and a lens 12.

Herein, in the embodiment, an electric driving device 21 of the lens 12 includes the CPU 2, a memory (in the embodiment, the flash ROM 3 and the RAM 4), the motor driver 7, the motor 8, the deceleration mechanism 9, the conversion mechanism 10, and the location sensor 11.

In the embodiment, a driving unit (driving system) 22 of the driving device 21 includes the motor driver 7, the motor 8, the deceleration mechanism 9, and the conversion mechanism 10.

In the embodiment, an image projection unit 23 includes the liquid crystal panel driver 5, the liquid crystal panel 6, and the lens 12.

In the embodiment, the CPU 2 is used as an example of a control unit and the location sensor 11 is used as an example of a driving state detection unit.

An outline of operations performed in the projector according to the embodiment will be described.

A moving image signal is input to the moving image input unit 1. The moving image input unit 1 outputs the input moving image signal to the CPU 2. Herein, a moving image signal output from an external device such as a personal computer (PC) is input to the moving image input unit 1, for example.

The flash ROM 3 records (holds) various data items, and in the embodiment, records data of a program or various data items.

The RAM 4 provides a recording region used by the CPU 2 and temporarily records various data items.

The CPU 2 reads data of the program recorded in the flash ROM 3, and executes various processes or controls while using data in the flash ROM 3 or the RAM 4 according to the program.

As a detailed example, the CPU 2 performs reading of the data recorded in the flash ROM 3 or the RAM 4 as an electric signal and writing of the data by outputting the electric signal to the flash ROM 3 or the RAM 4. The moving image signal output from the moving image input unit 1 is input to the CPU 2, and detection results of location (location detection results) acquired by the location sensor 11 are input to the CPU 2 as an electric signal. The CPU 2 performs a process (moving image process) for the moving image signal input from the moving image input unit 1, and outputs the moving image signal after the process to the liquid crystal panel driver 5. The CPU 2 outputs a signal (motor control signal) for controlling the motor driver 7 to the motor driver 7 as an electric signal. In addition, the CPU 2 performs a process related to selection of menu or a process related to operations of a keyboard, based on operation content of an operation unit (not shown) operated by a user.

As an example, the CPU 2 reads data of the program recorded in the flash ROM 3 or other necessary data, outputs the motor control signal to the motor driver 7 with the operations of the keyboard performed by a user, according to the program, and starts the driving of the motor 8.

The liquid crystal panel driver 5 drives the liquid crystal panel 6 by the moving image signal input from the CPU 2.

The liquid crystal panel 6 projects a moving image (image) corresponding to the moving image signal driven by the liquid crystal panel driver 5 to a projected object (not shown) such as a screen, through the lens 12.

The motor driver 7 outputs an electric signal to the motor 8 to drive the motor 8, based on the motor control signal input from the CPU 2.

The motor 8 is mechanically connected with the deceleration mechanism 9. The motor 8 is driven and rotated by the motor driver 7 and transmits power of the rotation to the deceleration mechanism 9.

The deceleration mechanism 9 is mechanically connected with each of the conversion mechanism 10 and the location sensor 11 (for example, a member supporting the location sensor 11). The deceleration mechanism 9 transmits the power transmitted from the motor 8 to each of the conversion mechanism 10 and the location sensor 11. The deceleration mechanism 9 is configured using one or a plurality of gears (gear teeth), and converts the gears to a suitable rate according to a rate of rotation of the motor 8.

The conversion mechanism 10 is mechanically connected with the lens 12 (for example, a member supporting the lens 12). The conversion mechanism 10 moves the location of the lens 12 according to the power transmitted by the deceleration mechanism 9. Accordingly, the location of the lens 12 is controlled for zooming, focusing, up and down shifting, and left and right shifting, for example.

In the embodiment, the control of focusing will be described as an example, however other controls can be applied in the same manner.

The location sensor 11 moves according to the power transmitted by the deceleration mechanism 9, detects information of the location of the deceleration mechanism 9 based on the amount of the movement (movement amount), and outputs location detection results including the information of the detected location (location information) to the CPU 2 as an electric signal.

Herein, the information of the location of the deceleration mechanism 9 can specify the location of the lens 12, and can be used as information same as information of the location of the lens 12. Accordingly, the CPU 2 can detect (identify) the location of the lens 12 based on the location detection results (information of location) input from the location sensor 11.

As the location detection results (information of location) for notifying the CPU 2 of the location of the lens 12 from the location sensor 11, the information of the location of the deceleration mechanism 9 may be used as it is, for example, and a value of the results converted by a method of predetermining a value showing information of location of the deceleration mechanism 9 may be used.

In addition, as the location sensor 11, a location sensor which detects location by various methods may be used, and, as an example thereof, an encoder can be used.

Configuration Example of Typical Driving System

Figure 10:
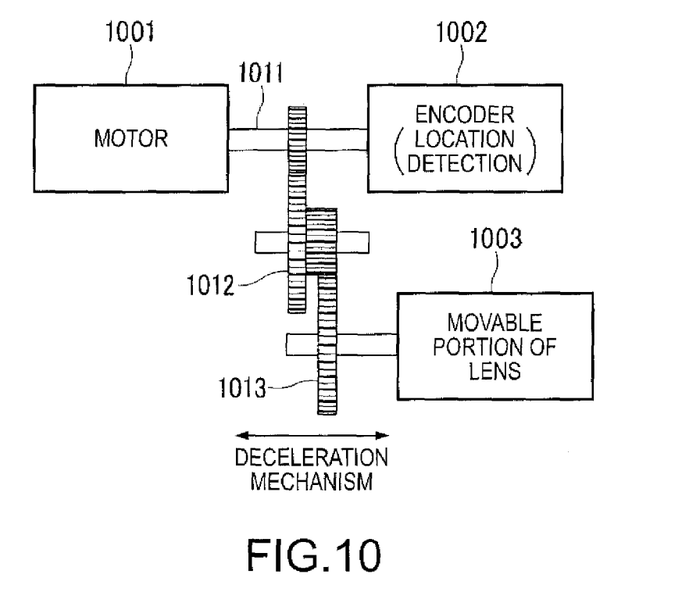
FIG. 10 is a block diagram showing a schematic configuration example of a typical driving system (omitting a motor driver).

FIG. 10 is a block diagram showing a schematic configuration example of a typical driving system (omitting a motor driver). In general, as shown in FIG. 10, most driving systems from the motor to the lens have a configuration of providing the location sensor (herein, encoder) nearer to the motor than the driving target (herein, lens).

In the configuration example shown in FIG. 10, a focus ring driving gear 1011 of a motor 1001 and an encoder (herein, used as an example of the location sensor) 1002 are closely and mechanically connected to each other, the focus ring driving gear 1011 of the motor 1001 and a relay gear 1012 are mechanically connected to each other, the relay gear 1012 and a driving gear (focus ring) 1013 of the lens are mechanically connected to each other, and the driving gear 1013 of the lens and a movable portion of the lens (for example, a member supporting a lens) 1003 are mechanically connected to each other.

In the configuration example shown in FIG. 10, a location of the motor 1001 side is acquired and a lens which is a driving target is driven, by the encoder 1002 directly connected to the motor 1001.

If the motor 1001 starts moving, the encoder 1002 starts moving before the lens, and the lens starts moving after the motor moved for the backlash amount of the deceleration mechanism. This time interval corresponds to backlash.

In such a configuration, the location information shown by the encoder 1002 changes in the range (in the period) of the backlash of the deceleration, however, the lens is practically not moved. When simply moving the driving system, since the driving is insufficient for that amount (amount of backlash), the driving is performed by adding the backlash amount.

Configuration Example of Driving Systems of Projector According to the Embodiment The driving system of the projector according to the embodiment has a configuration of providing the driving target (in the embodiment, lens 12) nearer to the motor 8 than the location sensor 11, and compared to the configuration example shown in FIG. 10, the location relationship between the location sensor and the movable portion of the lens is reversed.

Figure 2:
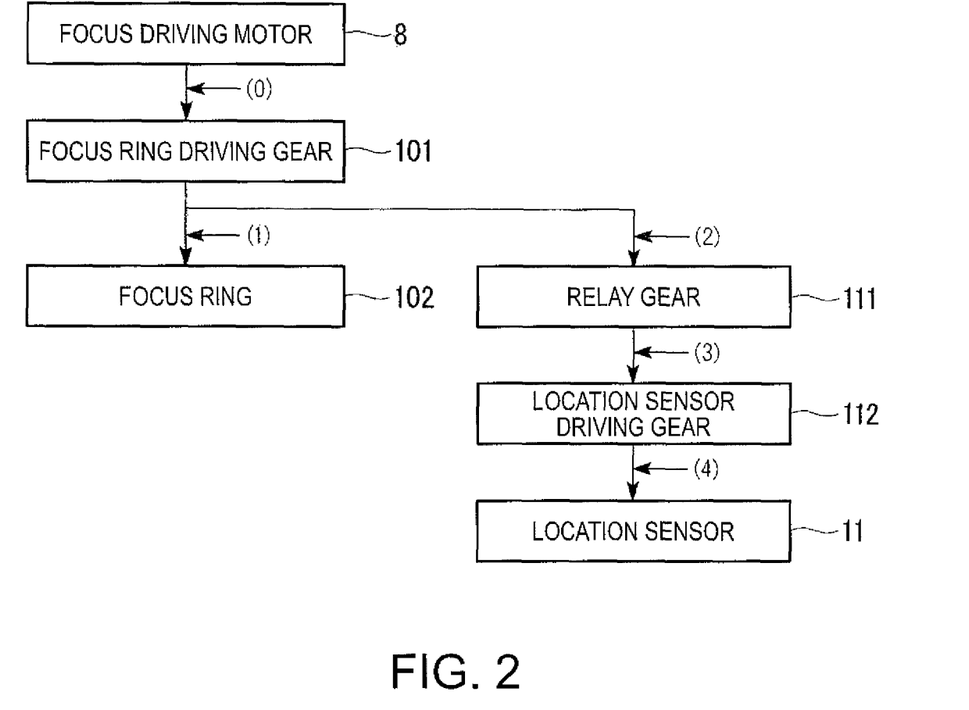
FIG. 2 is a view showing a configuration example of a driving system (omitting a motor driver) of a projector according to an embodiment of the invention.

FIG. 2 is a view showing a configuration example of the driving system (omitting the motor driver 7) of the projector according to the embodiment of the invention.

Figure 3:
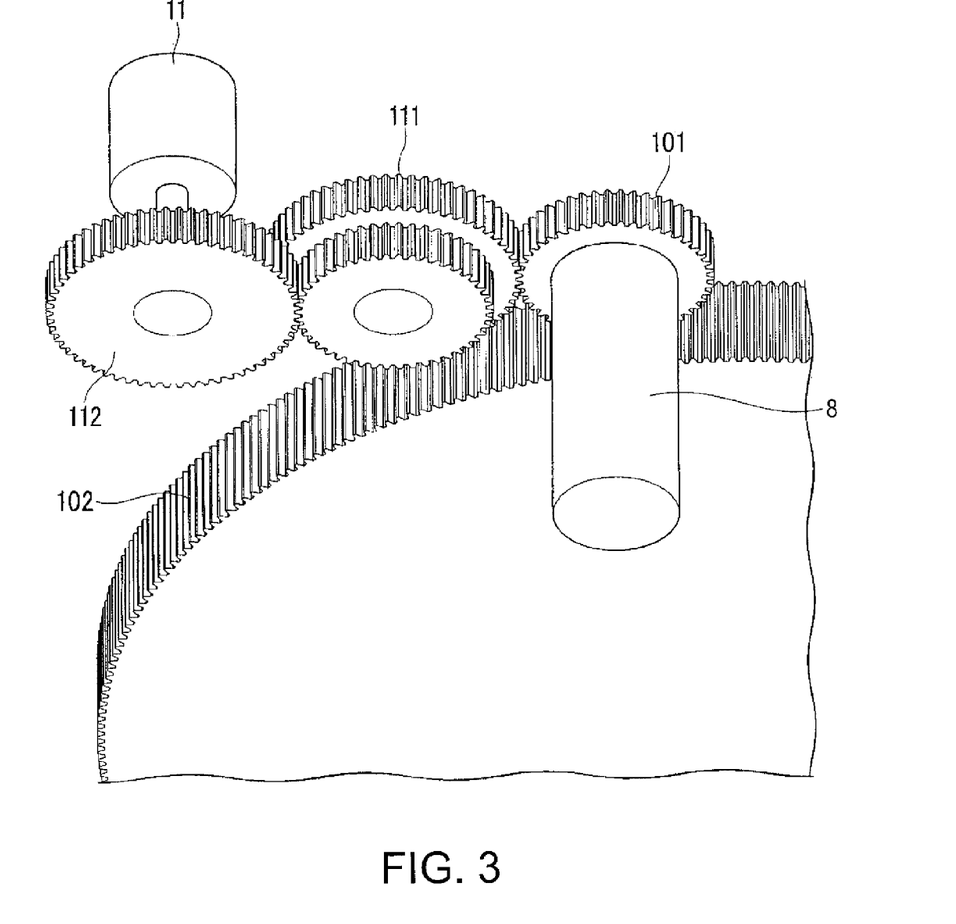
FIG. 3 is a view showing a schematic appearance example of a driving system (omitting a motor driver) of a projector according to an embodiment of the invention.

FIG. 3 is a view showing a schematic appearance example of the driving system (omitting the motor driver 7) of the projector according to the embodiment of the invention.

FIGS. 2 and 3 show examples of the focus driving unit.

In the configuration example of the driving system of the projector according to the embodiment, the motor (herein, the focus driving motor) 8 and a focus ring driving gear 101 are mechanically connected to each other, the focus ring driving gear 101 and a focus ring 102 are mechanically connected to each other, the focus ring driving gear 101 and a relay gear 111 are mechanically connected to each other, the relay gear 111 and a location sensor driving gear 112 are mechanically connected to each other, and the location sensor driving gear 112 and the location sensor 11 are mechanically connected to each other.

In addition, the focus ring 102 mechanically moves the lens 12.

In the embodiment, the deceleration mechanism 9 is configured by the focus ring driving gear 101, the relay gear 111, and the location sensor driving gear 112, and the conversion mechanism 10 is configured by the focus ring 102.

In addition, a relay gear having two or more stages may be used as the relay gear.

Herein, in the configuration of such a driving system, as reasons of generating backlash, there are (Reason 0) to (Reason 4) as follows.

(Reason 0) In mechanical connection between the motor 8 and the focus ring driving gear 101, an attachment space of a motor shaft and the gear can be a reason for backlash.

(Reason 1) Engagement of gear teeth of the focus ring driving gear 101 and the focus ring 102 can be a reason for backlash.

(Reason 2) Engagement of gear teeth of the focus ring driving gear 101 and the relay gear 111 can be a reason for backlash.

(Reason 3) Engagement of gear teeth of the relay gear 111 and the location sensor driving gear 112 can be a reason for backlash.

(Reason 4) In mechanical connection between the location sensor driving gear 112 and the location sensor 11, the attachment space can be a reason for backlash. In the embodiment, a D-shaped shaft is used as a member supporting the location sensor 11, the shaft is just passed through a hole of the location sensor 11 provided in a D shape, and a space can be formed therein.

In the configuration of the driving system of the projector according to the embodiment, if the motor 8 moves, the lens 12 immediately starts moving, however, the location sensor 11 does not move because of the backlash. Accordingly, in the range of the backlash of the location sensor 11, even when the CPU 2 monitors output (location detection results) from the location sensor 11, it is difficult for the CPU 2 to detect the movement and to perform control of the location.

Herein, in the driving device 21 of the projector according to the embodiment, when driving in the range of the backlash of the location sensor 11, the driving system is controlled without using the location information (information of the location acquired by the location sensor 11).

Control of Location Using Location Sensor of the Embodiment (Control of Normal Driving)

Herein, in control of the location using the location sensor 11, for example, the CPU 2 monitors the location information acquired by the location sensor 11 while continuously moving the motor 8 by adding constant voltage to the motor 8, and stops the motor 8 at a time point when the location information reaches a target location.

In addition, for example, a controlling method of changing voltage applied to the motor 8 according to a difference of the target location and the current location, or a controlling method of using an integrated value of the difference instead of the difference in this case, is general and can be used. The controlling methods are basically same at a point of monitoring the location information to stop the motor 8.

Figure 4:
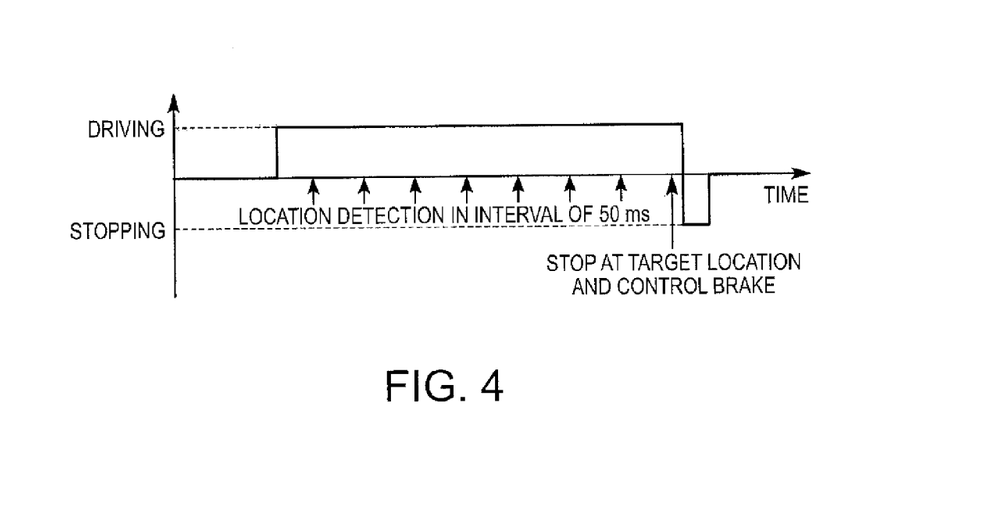
FIG. 4 is a view showing an example of an aspect of control of a motor based on location information acquired by a location sensor.

FIG. 4 is a view showing an example of an aspect of the control of the motor 8 based on the location information (location detection results) acquired by the location sensor 11.

In a graph shown in FIG. 4, a horizontal axis shows time, and a vertical axis shows a level of the motor control signal (in the embodiment, a level designating driving, a level of zero, and a level designating stopping) output from the CPU 2.

In the example shown in FIG. 4, by holding the level of the motor control signal at a constant level from zero to the level designating driving, the CPU 2 moves the motor 8 through the motor driver 7. The CPU 2 detects location information acquired by the location sensor 11 by a constant time interval (for example, interval of 50 ms), for example, while moving the motor 8, and compares the detected location with the target location. As a result of the comparison, when the detected location is detected to be matched with the target location, the CPU 2 holds the level of the motor control signal only for given time by lowering the level designating stopping, and stops movement of the motor 8 by applying brake only for that time. Accordingly, the location of the lens 12 can be moved to a location to be target. The CPU 2 sets the level of the motor control signal to zero after applying brake.

Control of Location considering Range of Backlash of Location Sensor of the Embodiment In the control of the location in the range (interval) of the backlash of the location sensor 11, by repeating driving of a predetermined driving unit (1 step which is a unit of driving) by the driving system, the CPU 2 moves the lens 12 to the predetermined location (target location).

By dividing the driving amount which is the target (driving amount to the target location) by the movement amount of the driving unit (first driving unit), the results thereof become the number of times of driving. By driving the driving system for the number of times of driving, the CPU 2 can move the lens 12 to the target location.

Herein, the movement amount of the lens 12 when performing the driving of the driving unit by the driving system once is given by calibration executed in advance, for example.

In the embodiment, by performing driving in the unit time as the driving of the driving unit, and repeatedly performing the driving in such unit time in a step form, the CPU 2 can realize minute driving less than the backlash amount until the location sensor 11 starts moving. The number of times of driving in the unit time necessary for the driving to the target location which is less than the backlash amount of the location sensor 11 (amount to be moved in a range of backlash of the location sensor 11) is the number of times corresponding to a result obtained by multiplying {(amount to target location)/(backlash amount of location sensor 11)} with respect to the number of times of driving unit necessary for removing (moving) the backlash amount of the location sensor 11. As the number of times of driving unit necessary for removing (moving) the backlash amount of the location sensor 11, for example, by acquiring the location information acquired by the location sensor 11 while repeatedly performing the driving of the unit time, the number of times of driving in the unit time necessary for driving the amount of the difference between the movement start of the driving target (in the embodiment, lens 12) and the movement start of the location sensor 11 is acquired.

At the time of actual driving control, the CPU 2 is necessary to determine whether or not the driving system is in a range of the backlash of the location sensor 11 in current. Accordingly, it is necessary that the backlash amount of the location sensor 11 (maximum value of the remaining backlash amount of the location sensor 11) is given, and the backlash amount of the location sensor 11 is acquired by calibration executed in advance, for example.

When driving the motor 8, the CPU 2 determines whether or not the location of the driving system in current is in the range of the backlash of the location sensor 11, while updating the remaining amount of the backlash (remaining backlash amount) of the location sensor 11. As a detailed example, in a case where the backlash amount of the location sensor 11 is 10 mm and the driving system is moved by 3 mm to a direction decreasing the backlash of the location sensor 11 from that state, the CPU 2 manages that the remaining backlash amount of the location sensor 11 is 7 mm.

In the embodiment, as will be described later, the CPU 2 manages the remaining backlash amount of the location sensor 11.

The CPU 2 holds the information of the driving direction when previously stopping the driving system in a memory (in the embodiment, RAM 4). The CPU 2 updates the information of the driving direction only when driving to exceed the range of the backlash of the location sensor 11 was performed (when the control of the location beyond the range of the backlash of the location sensor 11 was performed), and does not update the information of the driving direction when driving inside the backlash of the location sensor 11 was performed (when control of the location in the range of the backlash of the location sensor 11 was performed).

In the embodiment, there are two kinds of the driving directions related to focus control, and in detail, the directions are a driving direction to make the lens 12 and the liquid crystal panel 6 closer and the driving direction to make the lens 12 and the liquid crystal panel 6 farther.

When driving to exceed the range of the backlash of the location sensor 11 was performed, the CPU 2 updates the information of the driving direction, and sets backlash amount (for example, backlash amount given by the calibration) recorded in the memory (in the embodiment, flash ROM 3 or RAM 4), as an initial value of the remaining backlash amount of the location sensor 11 in a direction (opposite direction) opposite to the driving direction (previous driving direction).

In addition, when driving to exceed the range of the backlash of the location sensor 11 was performed, the CPU 2 updates the information of the driving direction as described above, and sets zero (0) as an initial value of the remaining backlash amount of the location sensor 11 in a direction (same direction) same as the driving direction (previous driving direction).

In the range of the backlash of the location sensor 11, the CPU 2 records and manages the current location (remaining backlash amount of the location sensor 11) in the memory (in the embodiment, RAM 4) in each of two directions. The movement amounts of the driving unit may be different in the two directions.

Herein, in the embodiment, the CPU 2 is configured to manage the backlash amount, the remaining backlash amount, and the movement amount of the driving unit in the two directions, respectively, relating to the location sensor 11. However, in a case where ways of changing the backlash amount, the movement amount of the driving unit, or the remaining backlash amount (values themselves are different by the directions) are same or similar in the two directions, for example, by communalizing both directions, for the CPU 2, a configuration of managing the ways of changing the common backlash amount, the common movement amount of the driving unit, or the common remaining backlash amount (managing the increased amount in one direction and decreased amount in the other direction to be equal) may be used. In addition, a standard of the backlash of the location sensor 11, a state where gears and gears are engaged is used, for example. In the embodiment, the remaining backlash amount of the location sensor 11 in an arbitrary direction is equal to or more than 0 and equal to or less than the backlash amount of the location sensor 11 in that direction, and does not become negative.

First Example of Driving Control

In a case of driving in a direction opposite to the previous driving direction and where the remaining backlash amount of the location sensor 11 with respect to that direction (the opposite direction) is larger than 0, the CPU 2 acquires the number of times of driving of the driving unit from the driving amount, and updates the value of the remaining backlash amount of the location sensor 11 to the value of a result obtained by subtracting a value of {(movement amount of driving unit)×(number of times of driving)} from the current remaining backlash amount of the location sensor 11. The CPU 2 controls the driving of the number of times of the driving, as the control of the location in the range of the backlash of the location sensor 11.

Second Example of Driving Control

In a case of driving in a direction opposite to the previous driving direction and where the remaining backlash amount of the location sensor 11 with respect to that direction (the opposite direction) is 0, the CPU 2 sets a value of a result obtained by subtracting the already moved amount from the driving amount (target value not considering the amount already moved in the range of the backlash of the location sensor 11) to an amount to be moved from the current. The CPU 2 drives and controls the motor 8 while monitoring the location information acquired by the location sensor 11, so that the amount to be driven from the current is achieved, as the control of the location beyond the range of the backlash of the location sensor 11. In addition, the backlash amount of the location sensor 11 is used, as the amount already moved in the range of the backlash of the location sensor 11, for example, and in this case, the driving amount (target value not considering the amount already moved in the range of the backlash of the location sensor 11) is set to a driving amount from the location information acquired by the location sensor 11 at the previous time.

Third Example of Driving Control

In a case of driving in a direction the same as the previous driving direction and where the remaining backlash amount of the location sensor 11 with respect to that direction (the same direction) is larger than 0, the CPU 2 acquires the number of times of driving of the driving unit from the driving amount, and updates the value of the remaining backlash amount of the location sensor 11 to the value of a result obtained by subtracting a value of {(movement amount of driving unit)×(number of times of driving)} from the current remaining backlash amount of the location sensor 11. The CPU 2 controls the driving of the number of times of driving, as the control of the location in the range of the backlash of the location sensor 11.

Fourth Example of Driving Control

In a case of driving in a direction same as the previous driving direction and where the remaining backlash amount of the location sensor 11 with respect to that direction (the same direction) is 0, the CPU 2 sets the driving amount (target amount) to an amount to be driven from the current. The CPU 2 drives and controls the motor 8 while monitoring the location information acquired by the location sensor 11, so that the amount to be driven from the current is achieved, as the control of the location beyond the range of the backlash of the location sensor 11. In addition, the driving amount (target amount) is set to a driving amount from the location information acquired by the location sensor 11 at the previous time.

Figure 5:
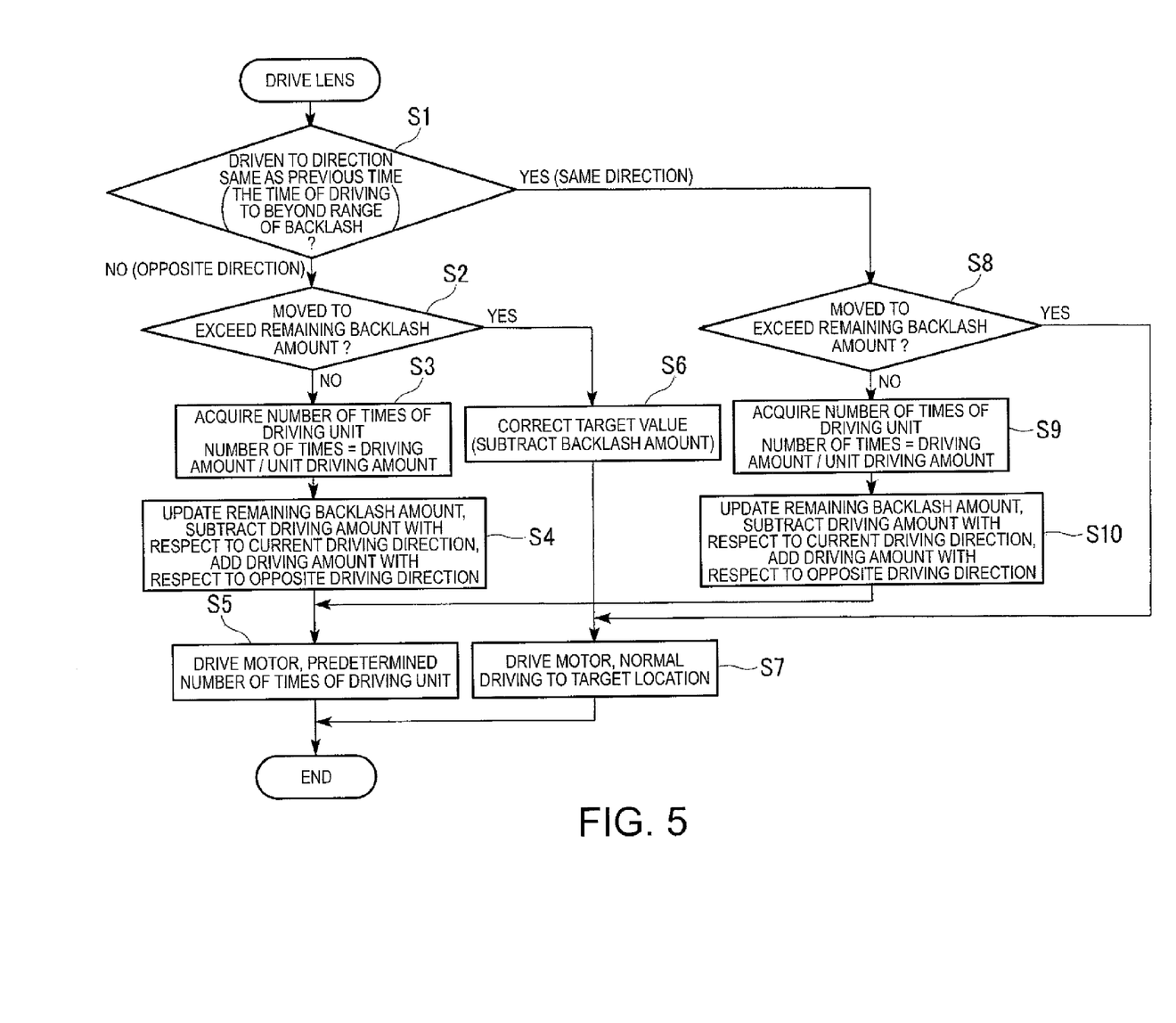
FIG. 5 is a view showing an example of a procedure of a process of control of location acquired by considering a range of backlash of a location sensor.

FIG. 5 is a view showing an example of a procedure of a process of control of location acquired by considering the range of the backlash of the location sensor 11 performed by the CPU 2.

First, if requirements of the driving (movement) of the lens 12 are generated, the CPU 2 determines to be driven in the same direction or not to be (to be driven in the opposite direction), based on the information of the driving direction at the time of previous driving (at the time of driving beyond the range of the backlash of the location sensor 11 at the previous time) (Step S1).

As the result of the process of Step S1, in a case where it is determined that there are requirements of the driving to a direction opposite to the driving direction at the time of previous driving (Step S1; No), the CPU 2 determines whether or not to move to exceed the remaining backlash amount of the location sensor 11 (whether or not the control of the location beyond the range of the backlash of the location sensor 11 is performed) (Step S2).

As the result of the process of Step S2, in a case where it is determined the movement to exceed the remaining backlash amount of the location sensor 11 is not performed (control of the location in the range of the backlash of the location sensor 11 is performed) (Step S2; No), the CPU 2 acquires a value of a result obtained by dividing the required driving amount by the driving amount of the driving unit (unit driving amount) as the number of times of driving unit (=driving amount/unit driving amount) (Step S3). Herein, the required driving amount is an amount less than the backlash amount of the location sensor 11.

The CPU 2 updates the remaining backlash amount of the location sensor 11 for an amount corresponding to the required driving amount (Step S4). In detail, the CPU 2 subtracts only the amount corresponding to the required driving amount from the remaining backlash amount, for the remaining backlash amount of the location sensor 11 in the present driving direction (direction opposite to the previous driving direction) or adds only the amount corresponding to the required driving amount to the remaining backlash amount, for the remaining backlash amount of the location sensor 11 in the opposite driving direction (the same direction as the previous driving direction).

In addition, the CPU 2 drives the motor 8 and executes the driving (movement) of the driving unit only the number of times acquired in the process of Step S3.

As a result of the process of Step S2, in a case where it is determined that the movement to exceed the remaining backlash amount of the location sensor 11 is performed (control of the location beyond the range of the backlash of the location sensor 11 is performed) (Step S2; Yes), the CPU 2 acquires the result obtained by subtracting the backlash amount of the location sensor 11 from the required driving amount, as the driving amount after correction (Step S6). Herein, the required driving amount (target value) is an amount exceeding the backlash amount of the location sensor 11, is obtained by standardizing the location at the time of updating of the driving direction at the previous time (location at the time when the remaining backlash amount=backlash amount), and sets the driving amount after correction obtained by subtracting the backlash amount of the location sensor 11 from the required driving amount (target value), as the driving amount from the current (target value after correction).

In addition, by the control of the location using the location sensor 11 (control of normal driving), the CPU 2 drives the motor 8, and controls the driving system to the location (target location) where the driving amount from the current (target value after correction) is achieved, while monitoring the location information acquired by the location sensor 11 (Step S7).

As a result of the process in Step S1, in a case where it is determined there are requirements of the driving to a direction same as the driving direction at the time of previous driving (Step S1; Yes), the CPU 2 determines whether or not the movement exceeding the remaining backlash amount of the location sensor 11 is performed (whether or not the control of the location beyond the range of the backlash of the location sensor 11) (Step S8).

As a result of the process in Step S8, in a case where it is determined that movement exceeding the remaining backlash amount of the location sensor 11 is not performed (control of the location in the range of the backlash of the location sensor 11 is performed) (Step S8; No), the CPU 2 acquires a value of a result obtained by dividing the required driving amount by the driving amount in the driving unit (unit driving amount) as the number of times of the driving unit (=driving amount unit driving amount) (Step S9). Herein, the required driving amount is an amount less than the backlash of the location sensor 11.

The CPU 2 updates the remaining backlash amount of the location sensor 11 for an amount corresponding to the required driving amount (Step S10). In detail, the CPU 2 subtracts only the amount corresponding to the required driving amount from the remaining backlash amount, for the remaining backlash amount of the location sensor 11 in the present driving direction (direction same as the previous driving direction) or adds only the amount corresponding to the required driving amount to the remaining backlash amount, for the remaining backlash amount of the location sensor 11 in the opposite driving direction (the direction opposite to the previous driving direction).

In addition, the CPU 2 drives the motor 8 and executes the driving (movement) of the driving unit, number of times acquired in the process of Step 9 (number of times of driving) (Step S5).

As a result of the process in Step S8, in a case where it is determined that movement exceeding the remaining backlash amount of the location sensor 11 is performed (control of the location beyond the range of the backlash of the location sensor 11 is performed) (Step S8; Yes), the CPU 2 sets a location satisfying the required driving amount, to the target location. Herein, the required driving amount is obtained by standardizing the location at the time of updating the driving direction at the previous time (location when the remaining backlash amount of the location sensor 11=0), and the value itself is set to the target value.

In addition, by the control of the location using the location sensor 11 (control of the normal driving), the CPU 2 drives the motor 8, and controls the driving system to the location (target location) where the required driving amount (target value) is achieved, while monitoring the location information acquired by the location sensor 11 (Step 7).

Acquisition of Backlash Amount of Location Sensor by Calibration

An example of a procedure of the process of acquiring the backlash amount of the location sensor 11 by the calibration will be described with reference to FIGS. 6 to 9. In the embodiment, the process is executed by controlling of the CPU 2, however, as the other configuration example, by including a device for calibration, instead of the projector (particularly, driving device 21) according to the embodiment, the process may be executed by the device.

Figure 6:
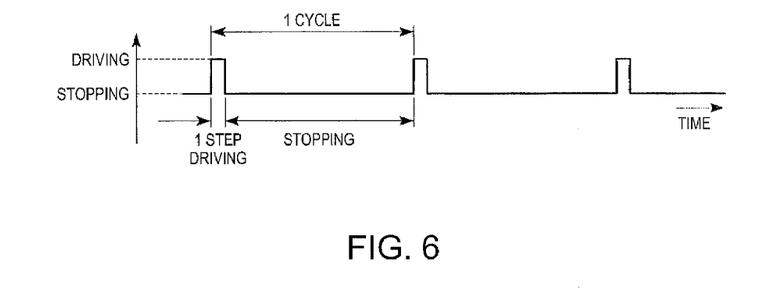
FIG. 6 is a view showing an example of an aspect of control of a driving system in calibration.

FIG. 6 is a view showing an example of an aspect of the control of the driving system of calibration.

In a graph shown in FIG. 6, a horizontal axis shows time, and a vertical axis shows an aspect (driving or stopping) of the control of the driving system. In this example, the brake control as shown in FIG. 4 is omitted, and the brake control is included in the control of stopping.

As shown in FIG. 6, by repeating the control for the driving in 1 Step (driving unit for one time) (control for turning on the motor 8) and control for stopping thereof (control for turning off the motor 8), with respect to the driving system, the CPU 2 acquires the location information acquired by the location sensor 11 while repeating the driving of 1 Step in constant cycle.

Herein, the time of the driving of 1 Step and the time of stopping for one time are set in the given time, respectively, and in an example of FIG. 6, compared to the time of the driving of 1 Step, the time of stopping for one time is longer.

In addition, in the embodiment, the CPU 2 sets the time joining the time of the driving of 1 Step and the time of stopping for one time, as one cycle time of the driving control, and acquires the location information acquired by the location sensor 11 for the time for one cycle.

The CPU 2 has a function of an analog-digital converter (ADC), for example, and if a signal of a location detection result (information of location) output from the location sensor 11 as an analog signal is input, the signal is converted to the digital value (ADC value) by the function of the ADC, and the ADC value is read and acquired as the location information. In this case, for example, by making the numerical value (ADC value) of the location information and the location of the lens 12 as a pair on one-on-one, setting of a parameter used for the control or control using the parameter can be performed.

Figure 7:
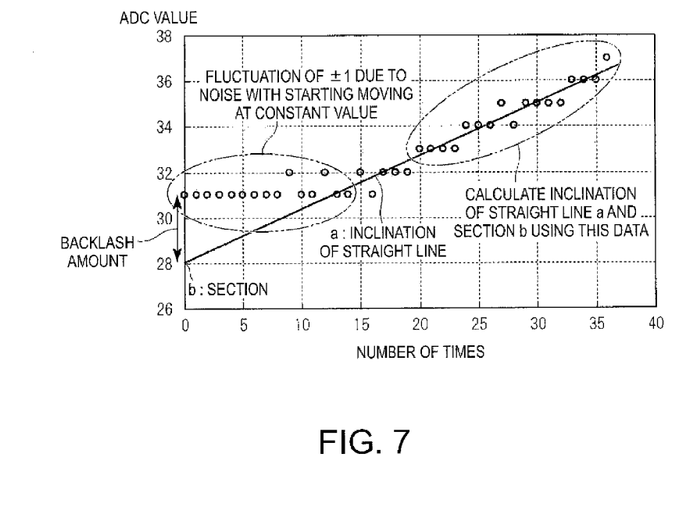
FIG. 7 is a view showing an example of a relationship between number of cycles and an ADC number (location information) of driving control in calibration.

FIG. 7 is a view showing an example of a relationship between the number of times of a cycle of the driving control of calibration and the ADC value (location information).

In a graph shown in FIG. 7, a horizontal axis shows the number of times (total number) of cycles of the driving control, and a vertical axis shows the ADC value (location information). In this example, as the ADC value (location information) becomes larger, the changing amount (movement amount) of location shows a larger value.

As shown in FIG. 7, when the driving control in the given cycle just starts and the motor 8 just starts moving, the ADC value (location information) is kept as a given value, and for example, is changed by ±1 due to noise. After that, if the driving control is continued, the backlash amount of the location sensor 11 exceeded, and the ADC value (location information) is linearly increased with respect to the number of times (total number) of cycles of the driving control while having variation.

Herein, by using data of the portion where the ADC value (location information) is linearly increased with respect to the number of times (total number) of cycles of the driving control, while having variation, the CPU 2 calculates and acquires inclination of a straight line a, and a section of the straight line b (ADC value of the vertical axis when the number of times of the horizontal axis is 0, related to the straight line).

The difference between the section b and the measured value of the ADC value when the number of times of the horizontal axis is 0, corresponds to the backlash amount of the location sensor 11.

As an example of the method of selecting data used by the CPU 2 for calculating the inclination of the straight line a and the section b, (Selection Example 1) to (Selection Example 4) are shown.

In (Selection Example 1), for the data when the driving control of the given cycle just starts and the motor 8 just starts moving, the ADC value is not changed for the backlash of the location sensor 11, the data is determined not to be a target of calculation and is not used.

In (Selection Example 2), for the data when the driving control of the given cycle just starts and the motor 8 just starts moving, since fluctuation may occur due to noise even when the ADC value is changed due to the backlash of the location sensor 11, with the fluctuation of ±1 (may be the other arbitrary numerical value) as an exception, for example, the data is determined not to be a target of calculation and is not used.

In (Selection Example 3), with respect to the initial value (for example, a value immediately before the changing) of the portion where the ADC value starts changing, the ADC value having the difference equal to or more than ±2 (may be the other arbitrary numerical value), for example, is determined as a target of calculation and is used. In this case, an aspect of using all ADC values subsequent to such an ADC value as a target of calculation can be used, for example.

In (Selection Example 4), with respect to the initial value (for example, a value immediately before the changing) of the portion where the ADC value starts changing, in a case where the ADC value having the difference of equal to or more than ±2 (may be the other arbitrary numerical value) continues the previously given number of times (predetermined number of times), for example, the ADC value subsequent to the initial ADC value among the continued value is determined as a target of calculation and is used.

Figure 8:
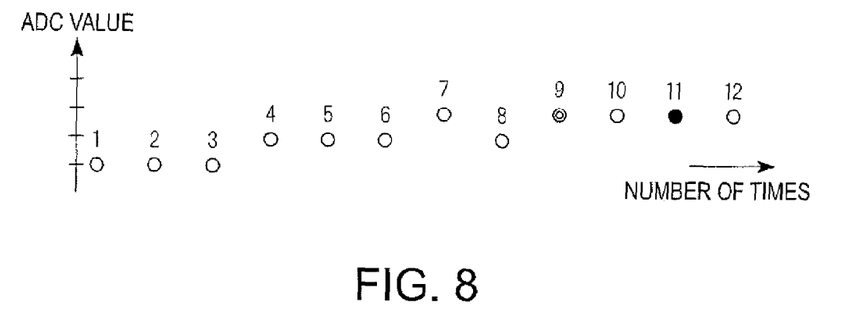
FIG. 8 is a view for illustrating a detailed example of (Selection Example 4) of data used for calculation in calibration.

FIG. 8 is a view for illustrating a detailed example of (Selection Example 4) of the data used for calculation in calibration.

In a graph shown in FIG. 8, in the same manner as the graph shown in FIG. 7, a horizontal axis shows the number of times (total number) of cycles of the driving control, and a vertical axis shows the ADC value (location information).

In the example of FIG. 8, in a case of setting the predetermined number of times (number of times of repeating detection) to 3, with respect to the ADC value for the first time, a portion where the first three times are continued and the difference of the ADC values becomes equal to or more than 2 is from the ninth ADC value to eleventh ADC value, and by setting the ninth ADC value as head data which is the target of calculation, with the continued number of times as the first time, the data subsequent thereto is used and calculated.

Figure 9:
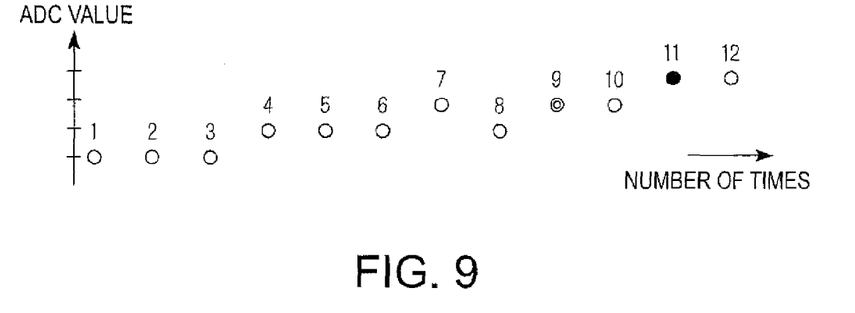
FIG. 9 is a view for illustrating another detailed example of (Selection Example 4) of data used for calculation in calibration.

FIG. 9 is a view for illustrating another detailed example of (Selection Example 4) of data used for calculation in calibration.

In a graph shown in FIG. 9, in the same manner as the graph shown in FIG. 7, a horizontal axis shows the number of times (total number) of cycles of the driving control, and a vertical axis shows the ADC value (location information).

In the example of FIG. 9, in a case of setting the predetermined number of times (number of times of repeating detection) to 3, with respect to the ADC value for the first time, a portion where the first three times are continued and the difference of the ADC values becomes equal to or more than 2 is from the ninth ADC value to eleventh ADC value, and by setting the ninth ADC value as head data which is the target of calculation, with the continued number of times as the first time, the data subsequent thereto is used and calculated.

Next, an example of the method of calculating the inclination of the straight line a and the section b will be described.

By setting the number of times shown by the horizontal axis in the graph shown in FIG. 7 as x, and by setting the results obtained by reading out the ADC value shown by the vertical axis with respect to the number of times x as y, the inclination of the straight line a and the section b described above can be calculated and acquired by using Formula (1) and Formula (2). In Formula (1) and Formula (2), n denotes the number of times of data which is the target of calculation.

Herein, a calculation shown by Formula (1) and Formula (2) is generally called a least-square method, and is well known.

$$a = \frac{n \sum_{k=1}^{n} x_k y_k - \sum_{k=1}^{n} x_k \sum_{k=1}^{n} y_k}{n \sum_{k=1}^{n} x_k^2 - \left(\sum_{k=1}^{n} x_k\right)^2} \tag{1}$$

$$b = \frac{\sum_{k=1}^{n} x_k^2 \sum_{k=1}^{n} y_k - \sum_{k=1}^{n} x_k y_k \sum_{k=1}^{n} x_k}{n \sum_{k=1}^{n} x_k^2 - \left(\sum_{k=1}^{n} x_k\right)^2} \tag{2}$$

In the embodiment, as an example, the values subsequent to the ADC value which are values which the ADC value is separated by 2 or more from the initial value are selected as the data of the target of calculation. For example, (Selection Example 3) can be used.

In addition, as the number of times of the data acquired by being selected as the target of calculation, 20 times (for example, 20 times from the initial data which is the target of calculation in a portion where the location information acquired by the location sensor 11 is moved) or the greater number of times than that is used.

As shown in Formula (3), the backlash amount BL of the location sensor 11 corresponds to the difference between the section b of the straight line described above and a location ($y_s$) at the time when starting moving of the ADC value.

Herein, as the location ($y_s$) at the time when starting moving of the ADC value, the location information before starting driving of the driving system can be used, for example.

$$BL = b - y_s \tag{3}$$

In addition, a location corresponding to an intersection when $y=y_s$ and $y=ax+b$, is a location when the location sensor 11 is moved. A value $x_s$ of the number of times x in the location is shown by Formula (4).

$$y_S = ax_S + b, \text{ then } x_S = \frac{(y_S - b)}{a} \tag{4}$$

In various calculations for improving precision by eliminating the effect of noise or broken number, an average value of the arbitrary number of times can be acquired to use the average value.

Herein, in the embodiment, the calibration is performed using the measured value as shown in the graph shown in FIG. 7, however, as the other configuration example, a value of the backlash amount of the location sensor 11 may be set using a logical designed value.

As described above, in the driving device 21 of the projector according to the embodiment, for example, in a mechanism of the focus control of the driving target (in the embodiment, the lens 12 which is the target to be driven), since the backlash until the location sensor 11 moves is larger than the backlash until the motor 8 drives the lens 12, if the motor 8 is moved (rotated), the lens 12 moves, however, there is a region where the location sensor 11 does not move (change of location is not detected). In the driving device 21 of the projector according to the embodiment, such a region is expected by the previous measurement, for example, and in the driving in the range of the backlash of the location sensor 11, with a driving aspect which is different from the time of normal driving (time of driving based on the location information acquired by the location sensor 11), the motor 8 is driven so as to repeatedly perform the driving of the driving unit.

Accordingly, in the driving device 21 of the projector according to the embodiment, for example, even in a region having an amount less than the backlash amount of the location sensor 11 where the proper location information is not acquired by the location sensor 11 (control of the location in the range of the backlash of the location sensor 11), the driving system is properly driven, and the location of the driving target can be properly controlled.

As described above, in the driving device 21 of the projector according to the embodiment, the control related to the backlash can be efficiently performed.

Herein, in the embodiment, the driving device 21 in which the backlash of the location sensor 11 driven by the driving unit 22 is greater than the backlash of the driving target (in the embodiment, the lens 12) driven by the driving unit 22 is shown, however, as the other configuration example, a configuration of performing two kinds of control (control of the location in the predetermined range and control of the location beyond the predetermined range) with respect to the driving system as the driving device 21 according to the embodiment can be applied to the driving device in which the backlash of the driving target driven by the driving unit is larger than the backlash of the location sensor (or other detection unit) driven by the driving unit.

In addition, in the embodiment, the case of applying the control related to the backlash to the driving device 21 is shown, however, as the other configuration, a configuration of performing two kinds of control (control of the location in the predetermined range and control of the location beyond the predetermined range) with respect to the driving system as the driving device 21 according to the embodiment can be applied to others than the backlash.

In the embodiment, the driving device 21 is applied to the projector, however, the function (all functions or a part of function) of the driving device 21 according to the embodiment may be applied to the others.

Configuration Example according to the Embodiment

A configuration example according to the embodiment is shown.

As a configuration example, the driving device 21 includes a driving state detection unit (in the embodiment, location sensor 11) which detects a driving state (in the embodiment, information of location) of the driving unit 22 which drives a driving target (in the embodiment lens 12), and a control unit (in the embodiment CPU 2) which performs a first control for driving the driving unit 22 for an amount based on the driving state of the driving unit detected by the driving state detection unit (in the embodiment, control of location beyond the range of the backlash of the location sensor 11) and a second control for driving the driving unit 22 for a predetermined amount (in the embodiment, amount less than the backlash amount of the location sensor 11) (control of location within the range of the backlash of the location sensor 11).

As a configuration example, in the driving device 21, the control unit performs the first control in a case of driving the driving unit 22 for the amount beyond a predetermined range (in the embodiment, range of backlash of the location sensor 11), and performs the second control in a case of driving the driving unit 22 for the amount in the predetermined range.

As a configuration example, in the driving device 21, the driving target is the lens 12, the driving state detection unit is the location sensor 11 which detects a location (in the embodiment, location of the deceleration mechanism 9) of a target moved by the driving of the driving unit 22 as a driving state of the driving unit 22, the predetermined range is a range of backlash of the driving state detection unit, the predetermined amount of the second control is an amount less than the backlash of the driving state detection unit, and in the second control, the control unit manages the driving state (in the embodiment, current location in the range of the backlash of the location sensor 11) of the driving unit in the range of the backlash of the driving state detection unit, without referring to detection results (in the embodiment, information of location) by the driving state detection unit.

As a configuration example, in the driving device 21, the backlash of the driving state detection unit driven by the driving unit 22 is larger than the backlash of the driving target driven by the driving unit 22.

As a configuration example, in the driving device 21, a value (in the embodiment, backlash amount of the location sensor 11) which is obtained by calibration performed based on detection results (in the embodiment, measurement results shown in FIG. 7) obtained by the driving state detection unit which are measured by repeatedly executing the driving of the driving unit 22 by the second control plural times is set and used.

As a configuration example, a projector includes the driving device 21 described above, and the image projection unit 23 which projects an image, and the driving target of the driving device 21 is the lens 12 of the image projection unit 23.

As a configuration example, the driving method includes: causing a driving state detection unit to detect a driving state of a driving unit which drives a driving target; causing a control unit to perform a first control for driving the driving unit for an amount based on the driving state of the driving unit detected by the driving state detection unit; and causing the control unit to perform a second control for driving the driving unit for a predetermined amount.

As a configuration example, there is a driving program for executing on a computer procedures including: causing a driving state detection unit to detect a driving state of a driving unit which drives a driving target; causing a control unit to perform a first control for driving the driving unit for an amount based on the driving state of the driving unit detected by the driving state detection unit; and causing the control unit to perform a second control for driving the driving unit for a predetermined amount.

As a configuration example, the driving device 21 includes a control unit (in the embodiment, the CPU 2) which performs control for continuously driving the driving unit 22 (in the embodiment, control of location beyond the range of the backlash of the location sensor 11), and control for driving the driving unit 22 for each step (in the embodiment, control of the location in the range of the backlash of the location sensor 11).

Outline of the Embodiments

Hereinabove, the embodiments of the invention have been described with reference to the drawings, however, the detailed configuration is not limited to the embodiments, and designs in a range not departing from a scope of the invention are included.

A program for realizing functions of an arbitrary configuration unit of the device described above (for example, a projector itself or the driving device 21) is recorded in a computer-readable recording medium, and the program may be read in a computer system and may be executed. The "computer system" used herein includes an Operating System (OS) or hardware such as peripheral devices. In addition, the "computer-readable recording medium" refers to recording devices such as transportable media such as a flexible disk, a magnetic optical disc, a Read Only Memory (ROM), and a Compact Disk (CD)-ROM, hard disk built in a computer system, and the like. Further, the "computer-readable recording medium" refers to a recording medium which holds programs for a given time, as a volatile memory (RAM: Random Access Memory) in the computer system which is a server or a client in a case where the program is transmitted through network such as the Internet or communication lines such as phone lines.

In addition, the program may be transmitted from the computer system in which the program is stored in a recording device, to the other computer system, through a transmission medium or by a transmitted wave in a transmission medium. Herein, the "transmission medium" which transmits the program refers to a medium having a function of transmitting information, such as network (communication network) such as the Internet or communication lines such as phone lines.

In addition, the program described above may be a program for realizing a part of the function described above. Further, the program may be a program for realizing the function described above by combining with a program already recorded in the computer system, which is a so-called a differential file (differential program).

What is claimed is:

1. A driving device comprising:
   a driving state detection unit that detects a driving state of a driving unit that drives a driving target; and
   a control unit that performs a first control for driving the driving unit for an amount based on the driving state of the driving unit detected by the driving state detection unit and a second control for driving the driving unit for a predetermined distance amount that is a distance amount less than a backlash distance amount of the driving state detection unit.

2. The driving device according to claim 1, wherein the control unit performs the first control in a case of driving the driving unit for the amount beyond a predetermined distance range, and performs the second control in a case of driving the driving unit for the amount in the predetermined distance range.

3. The driving device according to claim 2,
   wherein the driving target is a lens,
   the driving state detection unit is a location sensor that detects a location of a target moved by the driving of the driving unit as a driving state of the driving unit,
   the predetermined distance range is a range of backlash of the driving state detection unit, and
   in the second control, the control unit manages the driving state of the driving unit in the range of the backlash of the driving state detection unit, without referring to detection results by the driving state detection unit.

4. A projector comprising:
   the driving device according to claim 3; and
   an image projection unit which projects an image,
   wherein the driving target of the driving device is a lens of the image projection unit.

5. A projector comprising:
   the driving device according to claim 2; and
   an image projection unit which projects an image,
   wherein the driving target of the driving device is a lens of the image projection unit.

6. The driving device according to claim 1,
   wherein backlash of the driving state detection unit driven by the driving unit is larger than backlash of the driving target driven by the driving unit.

7. A projector comprising:
   the driving device according to claim 6; and
   an image projection unit which projects an image,
   wherein the driving target of the driving device is a lens of the image projection unit.

8. The driving device according to claim 1,
   wherein a value which is obtained by calibration performed based on detection results obtained by the driving state detection unit which are measured by repeatedly executing the driving of the driving unit by the second control plural times is set and used.

9. A projector comprising:
   the driving device according to claim 8; and
   an image projection unit which projects an image,
   wherein the driving target of the driving device is a lens of the image projection unit.

10. A projector comprising:
    the driving device according to claim 1; and
    an image projection unit which projects an image,
    wherein the driving target of the driving device is a lens of the image projection unit.

11. A driving method comprising:
    causing a driving state detection unit to detect a driving state of a driving unit that drives a driving target;
    causing a control unit to perform a first control for driving the driving unit for an amount based on the driving state of the driving unit detected by the driving state detection unit; and
    causing the control unit to perform a second control for driving the driving unit for a predetermined distance amount that is a distance amount less than a backlash distance amount of the driving state detection unit.

* * * * *